(12) United States Patent
Bologna et al.

(10) Patent No.: US 11,902,397 B2
(45) Date of Patent: *Feb. 13, 2024

(54) SECURE REMOTELY CONTROLLED SYSTEM, DEVICE, AND METHOD

(71) Applicant: Panduit Corp., Tinley Park, IL (US)

(72) Inventors: Joseph P. Bologna, Fox Lake, IL (US); Justin A. Kennedy, Fairview, TX (US); Daniel M. Renne, Kalamazoo, MI (US)

(73) Assignee: Panduit Corp., Tinley Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/113,832

(22) Filed: Feb. 24, 2023

(65) Prior Publication Data

US 2023/0247107 A1    Aug. 3, 2023

Related U.S. Application Data

(63) Continuation of application No. 17/585,639, filed on Jan. 27, 2022, now Pat. No. 11,611,631.

(60) Provisional application No. 63/150,802, filed on Feb. 18, 2021.

(51) Int. Cl.
*H04L 67/562* (2022.01)
*H04L 67/025* (2022.01)
*H04L 67/12* (2022.01)

(52) U.S. Cl.
CPC .......... *H04L 67/562* (2022.05); *H04L 67/025* (2013.01); *H04L 67/12* (2013.01)

(58) Field of Classification Search
CPC ..... H04L 67/562; H04L 67/025; H04L 67/12; H04L 63/123; H04L 67/14
See application file for complete search history.

(56) References Cited

U.S. PATENT DOCUMENTS

| | | | |
|---|---|---|---|
| 9,710,634 B2 | 7/2017 | Fort et al. | |
| 9,900,301 B2 | 2/2018 | Yanacek et al. | |
| 10,127,908 B1* | 11/2018 | Deller | H04L 67/02 |
| 10,348,692 B2 | 7/2019 | Savolainen | |
| 10,382,203 B1* | 8/2019 | Loladia | H04L 63/06 |
| 10,673,646 B1 | 6/2020 | Shinar et al. | |
| 10,681,544 B2 | 6/2020 | Luo et al. | |
| 10,743,392 B2* | 8/2020 | Sharma | G06F 21/43 |
| 10,798,485 B1* | 10/2020 | Ivey | H04R 5/04 |
| 10,805,155 B1* | 10/2020 | Le | H04L 69/18 |
| 10,848,336 B2 | 11/2020 | Shinar et al. | |
| 10,848,638 B2 | 11/2020 | Yamakado et al. | |
| 11,133,953 B2* | 9/2021 | Shive | G06N 5/04 |
| 2007/0133843 A1 | 6/2007 | Nakatan | |
| 2008/0267092 A1* | 10/2008 | Willenborg | H04L 12/66 370/259 |
| 2016/0189147 A1 | 6/2016 | Vanczak | |

(Continued)

*Primary Examiner* — Javier O Guzman
(74) *Attorney, Agent, or Firm* — Christopher S. Clancy; James H. Williams; Peter S. Lee

(57) ABSTRACT

A system, device, and method for implementing secure control over audio-visual (AV) equipment connected to an AV gateway is disclosed. The solution includes utilizing a user device to remotely control the AV gateway by connecting both the user device and the AV gateway to an Internet of Things (IoT) network, and facilitating communication between the user device and the AV gateway via messages using an MQTT broker or IoT cloud services.

19 Claims, 6 Drawing Sheets

(56) References Cited

U.S. PATENT DOCUMENTS

| | | |
|---|---|---|
| 2017/0187597 A1* | 6/2017 | Nolan .................. H04L 43/0888 |
| 2018/0129519 A1 | 5/2018 | Bharadwaj |
| 2018/0184281 A1* | 6/2018 | Tamagawa .......... H04L 61/5007 |
| 2018/0299581 A1 | 10/2018 | Gunawan et al. |
| 2019/0082230 A1* | 3/2019 | Chang ................ H04N 21/4825 |
| 2019/0150134 A1* | 5/2019 | Kakinada .............. H04W 16/14 |
| | | 370/330 |
| 2020/0186379 A1* | 6/2020 | Shinar .................... H04W 4/12 |

* cited by examiner

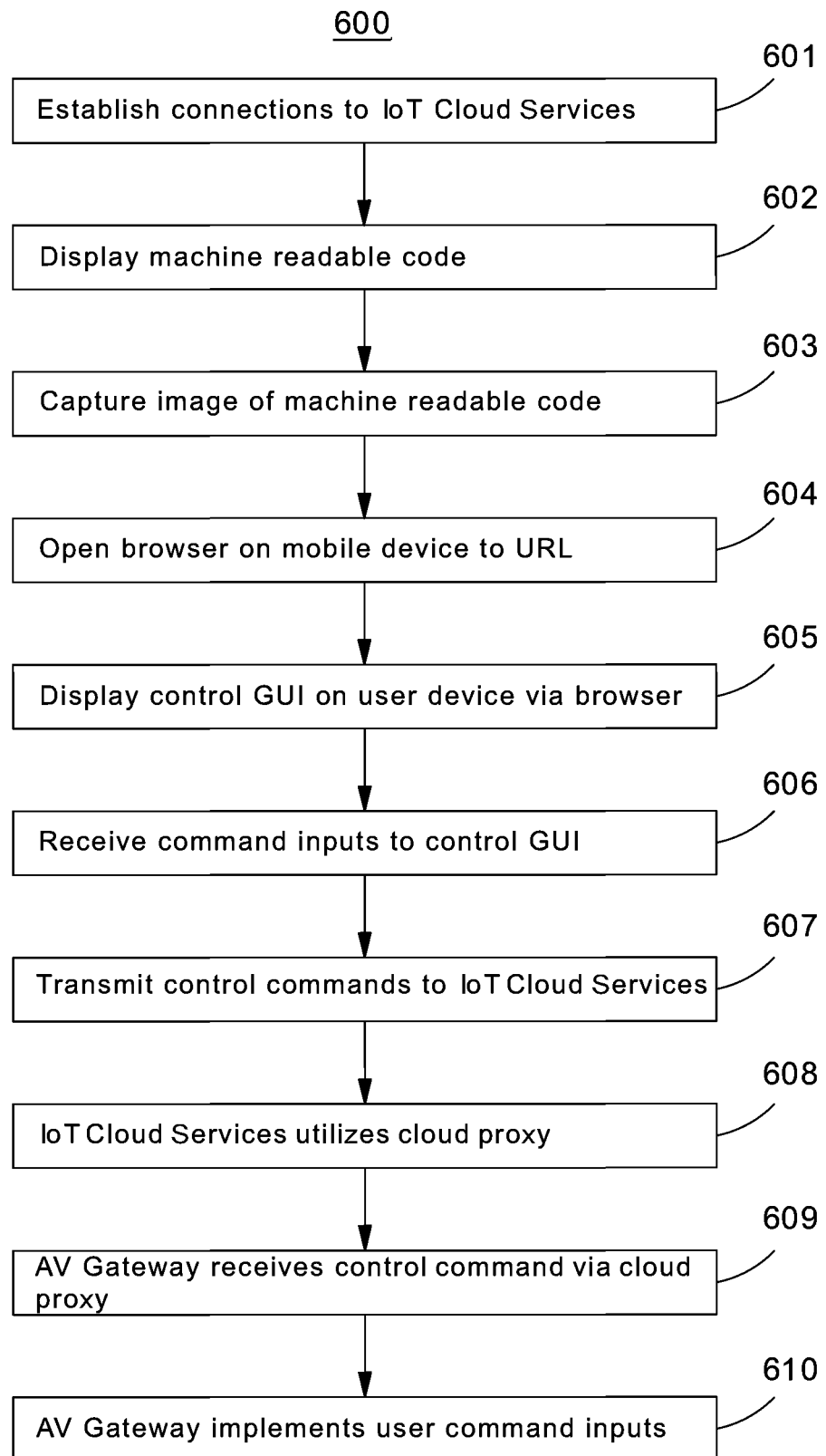

SECURE REMOTELY CONTROLLED SYSTEM, DEVICE, AND METHOD

CROSS-REFERENCE TO RELATED APPLICATION(S)

This application is a continuation of U.S. Non-Provisional patent application Ser. No. 17/585,639, filed Jan. 27, 2022, which claims benefit to U.S. Provisional Patent Application No. 63/150,802, filed on Feb. 18, 2021, the entirety of all of which are hereby incorporated by reference herein.

TECHNICAL FIELD

The following relates to a system, device, and method for implementing a secure control over audio visual (AV) equipment connected to an AV gateway by utilizing a user device to remotely control the AV gateway.

BACKGROUND

Enterprise building environments are equipped with audio visual systems to enhance operational functionality. These AV systems may be installed in multiple different rooms and may be controlled by one or more central AV gateway devices. However, cost considerations may result in the AV gateway device not being installed in every room where AV equipment is present, making real-time control over the AV equipment in such rooms difficult. Furthermore, it may be desirable to restrict access to an AV gateway device to avoid contamination by the public or enhance cybersecurity.

SUMMARY

According to one non-limiting exemplary embodiment described herein, a computing device is disclosed. The computing device comprising an image capturing device configured to capture an image, a display screen, a processor, and a storage device configured to store machine-readable instructions that, when executed by the processor, causes the processor to: register the computing device with a MQTT broker, control the image capturing device to capture an image of a machine-readable code displayed on a display screen of an AV gateway, open a browser application to connect to a web site identified in the machine-readable code, display an AV equipment controlling graphical user interface (GUI) on the display screen corresponding to the web site, receive, via the displayed AV equipment controlling GUI, control commands, and transmit the control commands to the MQTT broker, wherein the MQTT broker is configured to publish the control commands within a message received by the AV gateway for the AV gateway to control a remote AV equipment.

According to another non-limiting exemplary embodiment described herein, a computing device is disclosed. The computing device comprising a display screen, a processor, and a storage device configured to store machine-readable instructions that, when executed by the processor, causes the processor to: register the computing device as a subscriber to a topic published by a MQTT broker, display a machine-readable code on the display screen, receive, from the MQTT, a message corresponding to the subscribed topic, wherein the message includes a control command for controlling AV equipment, and control a remote AV equipment according to the control command.

According to another non-limiting exemplary embodiment described herein, a computing device is disclosed. The computing device comprising an image capturing device, a display screen, a processor, and a storage device configured to store machine-readable instructions that, when executed by the processor, causes the processor to establish a communication channel between the computing device and a message routing component, control the image capturing device to scan an image of a machine-readable code displayed on a display screen of a gateway device, extract web site address information from the scanned image, open a browser application, control the browser application to connect to a web site based on the web site address information, display a graphical user interface (GUI) on the display screen corresponding to the web site, receive, via the displayed GUI, control commands, and transmit the control commands to the message routing component, wherein the message routing component is configured to communicate the control commands within a message for the gateway device to receive.

According to another non-limiting exemplary embodiment described herein, a computing device is disclosed. The computing device comprising computing device comprising a display screen, a processor, and a storage device configured to store machine-readable instructions that, when executed by the processor, causes the processor to establish a communication channel between the computing device and a message routing component, display a machine-readable code on the display screen, receive, from the message routing component, a message including a control command for controlling remote equipment, and control the remote equipment according to the control command included in the message.

A detailed description of these and other non-limiting exemplary embodiments of a secure remotely controlled system, device, and method are set forth below together with the accompanying drawings.

BRIEF DESCRIPTION OF THE DRAWINGS

FIG. 6 shows an exemplary flow diagram describing a method for implementing a secure remotely controlled process, according to an alternative embodiment of the present disclosure.

DETAILED DESCRIPTION

Figure 1:
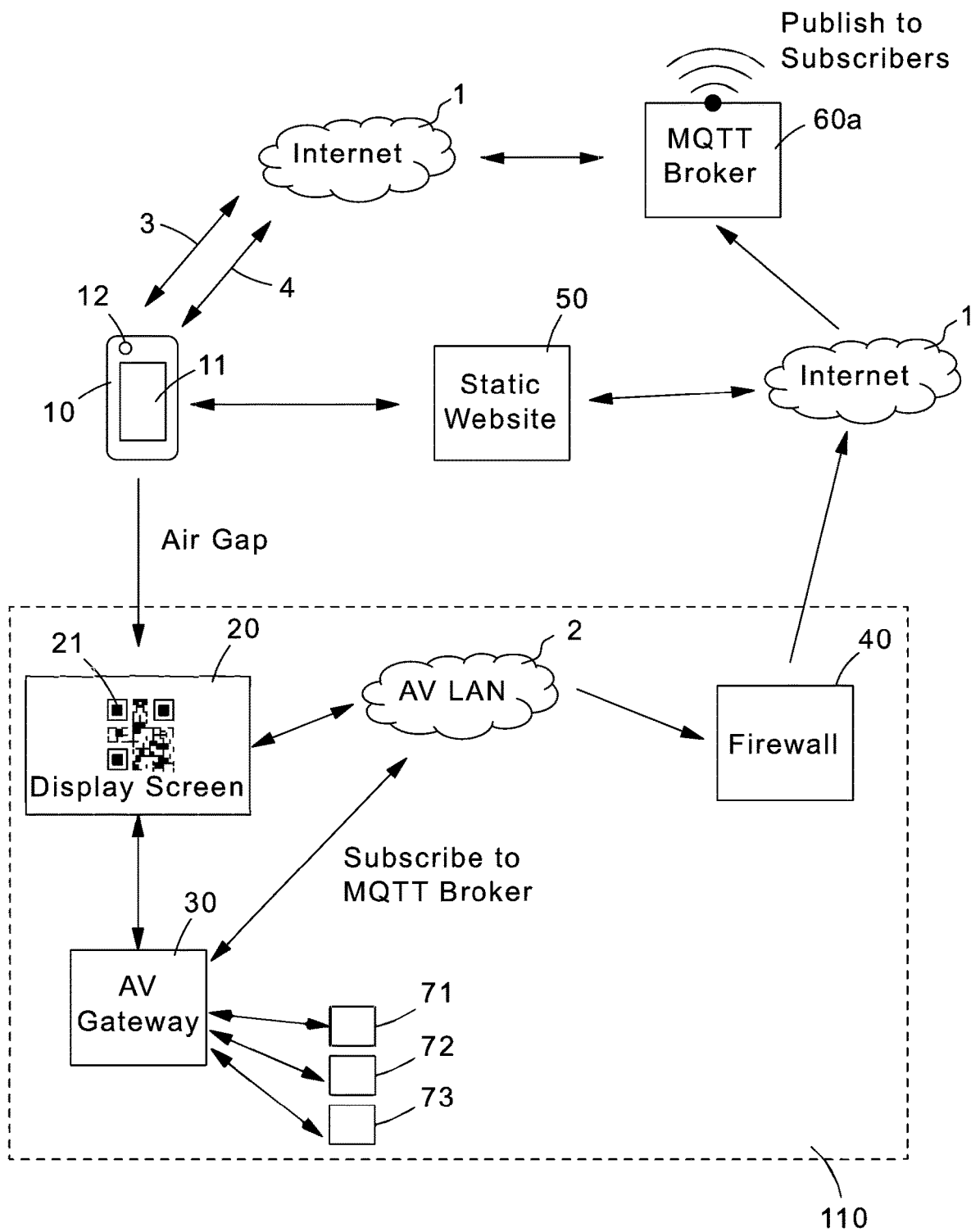
FIG. 1 shows an exemplary system block diagram of a secure remotely controlled system, according to an embodiment of the present disclosure.

As required, detailed non-limiting embodiments are disclosed herein. However, it is to be understood that the disclosed embodiments are merely exemplary and may take various and alternative forms. The figures are not necessarily to scale, and features may be exaggerated or minimized to show details of particular components. Therefore, specific structural and functional details disclosed herein are not to be interpreted as limiting, but merely as a representative basis for teaching one skilled in the art. For ease of illustration and to facilitate understanding, like reference numerals may be used herein for like components and features throughout the drawings. Furthermore, although the embodiments described herein refer to the remote control of audio-visual (AV) equipment connected together via an AV network, the secure remote access solution described herein may also apply to the remote control of devices connected together via a private network more generally using a switch/controller device in place of the AV gateway.

Many enterprise building environments now employ AV equipment at numerous different locations. To help control all the remote AV equipment, one or more AV gateway devices may be installed at various locations within the building. The AV gateway is a control device that a user may use to control one or more AV equipment that is in communication with the AV gateway. To help provide the control capabilities, the AV gateway may include, either within a same structure or as a separate device in close proximity, a touch screen display for controlling the AV equipment. However, for a variety of reasons (e.g., sanitary, efficiency, device longevity reasons), it may not be desirable to allow all users to physically interact with the touch screen device. So to address this situation, the current disclosure presents a solution that allows a user to utilize their own mobile device to transmit control commands to the AV gateway in a secure manner by taking advantage of Internet of Things (IoT) network protocols and/or IoT cloud services.

FIG. 1 shows an exemplary block diagram of a secure remotely controlled system 100 that utilizes IoT protocols to enable a user to securely control an AV gateway 30 from the user's mobile device 10.

Figure 3:
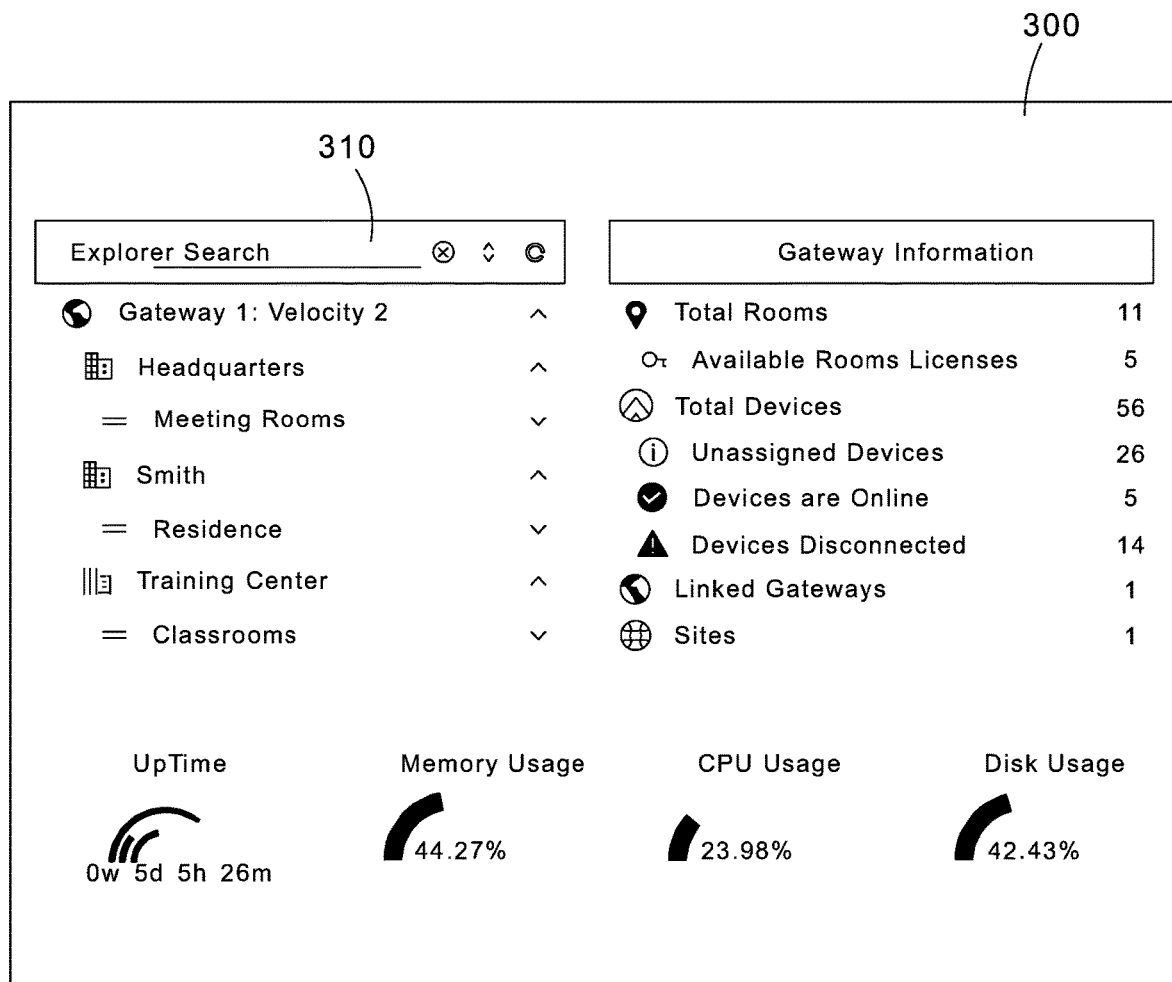
FIG. 3 shows an illustration of an exemplary graphical user interface (GUI) for controlling AV equipment that is displayed on a display screen, according to an exemplary embodiment of the present disclosure.

The AV gateway 30 includes a display screen 20, where the display screen 20 may be a touch screen. The display screen 20 is provided to display a control graphical user interface (GUI) 310 for controlling various control options relating to AV equipment connected to the AV gateway, as shown by the exemplary control GUI 310 in FIG. 3. In FIG. 3, the exemplary display screen 300 may be representative of either the display screen 20 or a display screen 11 part of the mobile device 10. According to some embodiments the display screen 20 may be an integral part of the same AV gateway 30, or according to other embodiments the display screen 20 may be a separate device that is in direct communication with the AV gateway 30. Also coupled to the AV gateway 30 are various remote AV equipment 71-73. The remote AV equipment may be speakers, display devices, AV mixers, extenders, or other equipment that may be part of a building's AV system 110. As shown in FIG. 1, the building's AV system 110 is connected via an AV local area network (LAN) 2, where the AV LAN 2 is behind a firewall 40 to protect the building's AV system 110 from outside intrusion.

The secure remotely controlled system 100 is configured to allow a user to enter the building and interact with the building's AV system 110 by utilizing the user's own mobile device 10. The mobile device 10 includes a display screen 11 and an image capturing device 12 capable of taking still images and/or video images. The mobile device 10 includes a network interface to connect to the Internet 1 via a Wi-Fi network connection 3 or a cellular data network connection 4. The mobile device 10 is able to communication and register itself with a MQTT broker 60a through its connection with the Internet 1. The mobile device 10 is also configured to access a static website 50 that is also served by the AV gateway 30. The static website 50 is configured to be read-only. The static website hosts a GUI that mirrors the control GUI 310 being displayed on the display screen 20 corresponding to the AV gateway 30. The control options may include, for example, selecting the specific AV equipment to control according to equipment names and/or building location, controlling AV characteristics of the selected AV equipment (e.g., volume control, display controls, or the like), turning on/off the selected AV equipment, or scheduling meeting rooms. The mobile device 10 is able to open the static website 50 through a browser running on the mobile device 10 to display the control GUI 310 on the display screen 11 of the mobile device 10, as will be described in more detail herein. The static website 50 may be hosted on a content delivery network (CDN). A CDN, by its normal operation supplies the static website 50, thus providing additional security by preventing in-bound the HTTP POST protocol normally used to control equipment. The static website 50 is hosted on a network server that is disconnected from the AV gateway 30. A CDN also makes it easier to deploy the application local to the region where the mobile device exists using a cached website that is very fast to load. It also makes it possible to update the website and let the CDN provider sync/push the updates initiation from a customer.

As the mobile device 10 is restricted from using the Internet to directly connect into the private AV LAN 2 where the AV gateway 30 is connected, the AV gateway 30 creates a secure public endpoint for the mobile device 10, using IoT cloud services, to open the static website 50 served by the AV gateway 30. The address of the static website 50 is coded into a machine-readable code 21 (e.g., barcode or QR code) that is displayed on the display screen 20. The mobile device 10 controls its image capturing device 12 to capture an image of the machine-readable code 21, thus providing a solution to span the air gap between the mobile device 10 and the display screen 20. The air gap is a security measure to prevent offsite attacks from trying to access the AV gateway 30 through intrusion into the AV LAN 2. This is because the air gap requires the user to be physically present within the room where the display screen 20 is located to gain remote access to the AV gateway 30. Upon capturing the image of the machine-readable code 21, the mobile device 10 will decode the machine-readable code 21 to recognize the address for the static website 50 coded within the machine-readable code 21. The mobile device then executes a browser on the mobile device 10 to navigate to the address. To enable the mobile device 10 to decode and recognize the machine-readable code 21, the mobile device 10 may have previously downloaded an application for doing so. Once the browser navigates to the address of the static website 50, the same control GUI 310 that belongs to the display screen 20 for controlling the AV gateway 30 will be displayed on the display screen 11 of the mobile device. The user may then interact with the control GUI 310 displayed on the mobile device 10 to control the AV gateway 30, the same as if the user were interacting with the control GUI 310 displayed on the display screen 20 corresponding to the AV gateway 30. The process for connecting the mobile device to the AV gateway 30 by utilizing IoT protocols is provided in more detail below.

Figure 2:
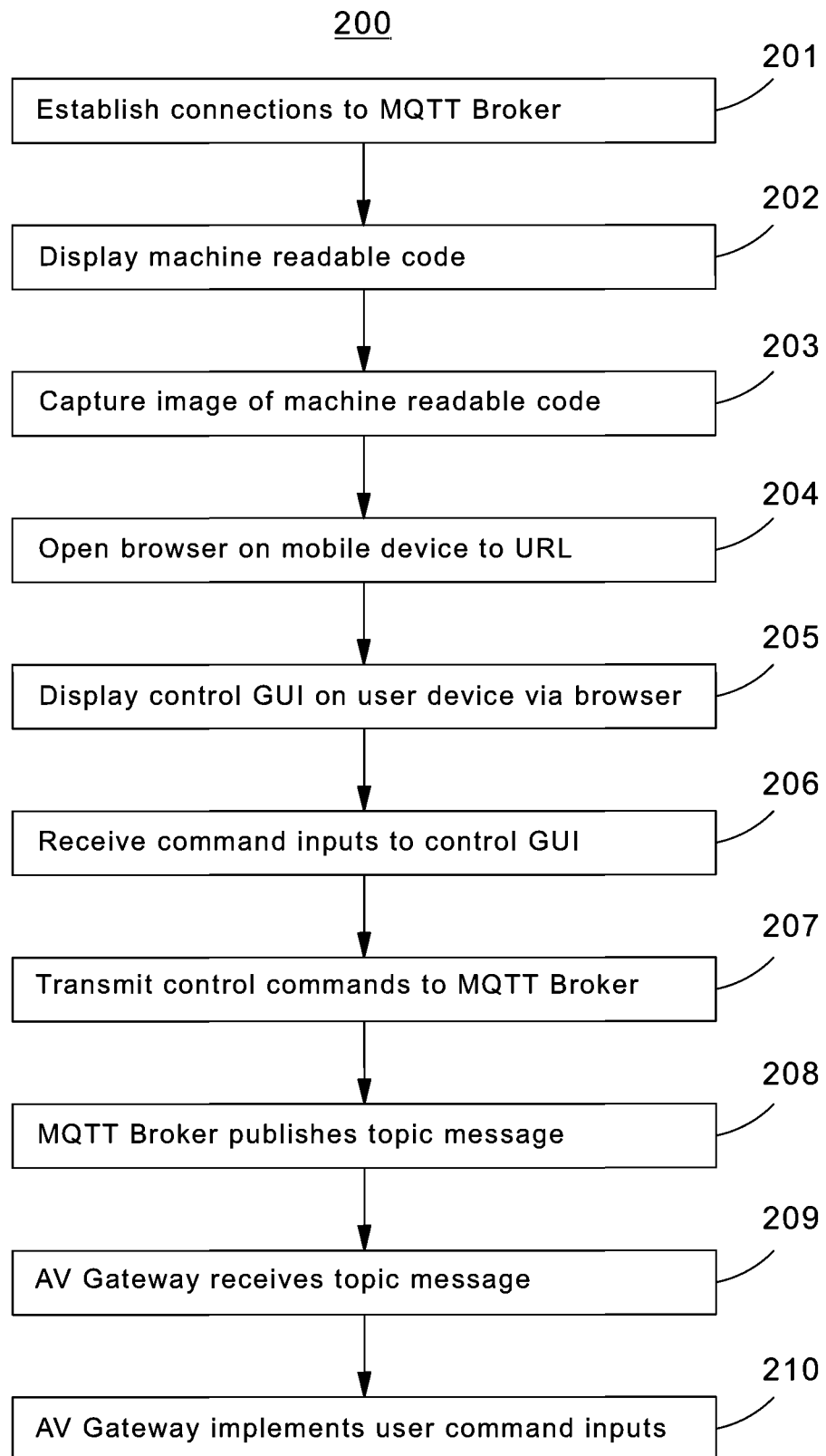
FIG. 2 shows an exemplary flow diagram describing a method for implementing a secure remotely controlled process, according to an embodiment of the present disclosure.

FIG. 2 shows an exemplary flow diagram 200 describing a process for implementing a secure remote control of the AV gateway 30. The description for the flow diagram 200 is made with reference to the components included in the secure remotely controlled system 100, although the process may be applicable to other similar systems. According to some embodiments, the features attributed to the mobile device 10 may be enabled by downloading and executing a secure application for gaining access to the AV gateway 30 on the mobile device 10, as described herein.

At 201, both the mobile device 10 and the AV gateway 30 establish independent connections to the MQTT broker 60a. For the mobile device 10, the mobile device 10 registers itself as a client of the MQTT broker 60a to enable it to transmit messages to the MQTT broker 60a. For the AV gateway 30, the AV gateway 30 registers itself as a subscriber to the MQTT broker 60a to be able to receive messages from the MQTT broker 60a. More specifically, the AV gateway 30 may register as a subscriber to a specific topic (e.g., AV gateway control topic) being published by the MQTT broker 60a.

At 202, the display screen 20 corresponding to the AV gateway 30 displays the machine-readable code 21. The machine-readable code 21 may be, for example, a QR code. According to some embodiments, an additional authentication step may be added before allowing the user to capture the image of the machine-readable code 21. For example, the user may be required to execute the secure application, where the secure application requires the user to input a passcode or provide some other authentication protocol (e.g., token or certification) before allowing the mobile device 10 to proceed to subsequent steps in the process described by the flow diagram 200. In addition or alternatively, the QR code may be replaced with a PIN or other alphanumeric passcode displayed onto the display screen 20. The machine-readable code 21, or its equivalent, may be updated to be different periodically to enhance security.

At 203, the mobile device 10 utilizes its image capturing device 12 to capture an image of the machine-readable code 21. For example, the user may open a camera application on the mobile device to enable utilizing the image capturing device 12 to capture and/or scan the image of the machine-readable code 21. The mobile device 10 may then decode and read the machine-readable code 21 to obtain the URL address for the static website 50.

The image of the machine-readable code 21 scanned for information, and the secure application may further prevent/restrict the image of the machine-readable code 21 from being stored on either the mobile device 10 or the image capturing device 12 which enhances security by requiring physical access to the display screen 20. According to some embodiments, an additional authentication step may be added before decoding the machine-readable code 21. For example, the user may be required to input a passcode or provide some other authentication protocol (e.g., token or certification) before the machine-readable code 21 is decoded and/or the mobile device 10 is allowed to proceed to subsequent steps in the process described by the flow diagram 200.

At 204, the mobile device 10 opens a browser that navigates to the URL address for the static website 50 recognized from the machine-readable code 21. Alternatively, the secure application may coordinate navigation to the URL address for the static website 50 based on the input of the correct PIN (or other human readable code) displayed on the display screen 20.

At 205, the browser displays the control GUI 310 that is hosted on the static website 50, where the control GUI 310 is the same as provided on the display screen 20 for controlling the AV gateway 30.

At 206, the mobile device 10 receives user command inputs through the control GUI 310. The command inputs are for controlling the AV gateway 30.

At 207, the mobile device 10 transmits a message to the MQTT broker 60a, where the message includes the user command inputs.

At 208, the MQTT broker 60a receives the message and publishes (i.e., broadcasts) the user command inputs within its own topic message, where subscribers of the MQTT broker 60a are set up to receive the topic message. So a subscriber to the AV gateway control topic with the MQTT broker 60a will receive the new topic message that includes the user command inputs.

At 209, the AV gateway 30 receives the topic message as being a subscriber to the AV gateway control topic with the MQTT broker 60a, where the topic message includes the user command inputs.

At 210, the AV gateway 30 reads the user command inputs from the topic message and executes the user command inputs to control the corresponding remote AV equipment 71-73 that are in communication with the AV gateway 30.

The flow diagram 200 is provided for exemplary purposes, as the secure remotely controlled system 100 may implement other processes that include fewer, or additional, steps to accomplish the secure remote control of the AV gateway 30 utilizing IoT protocols.

Figure 5:
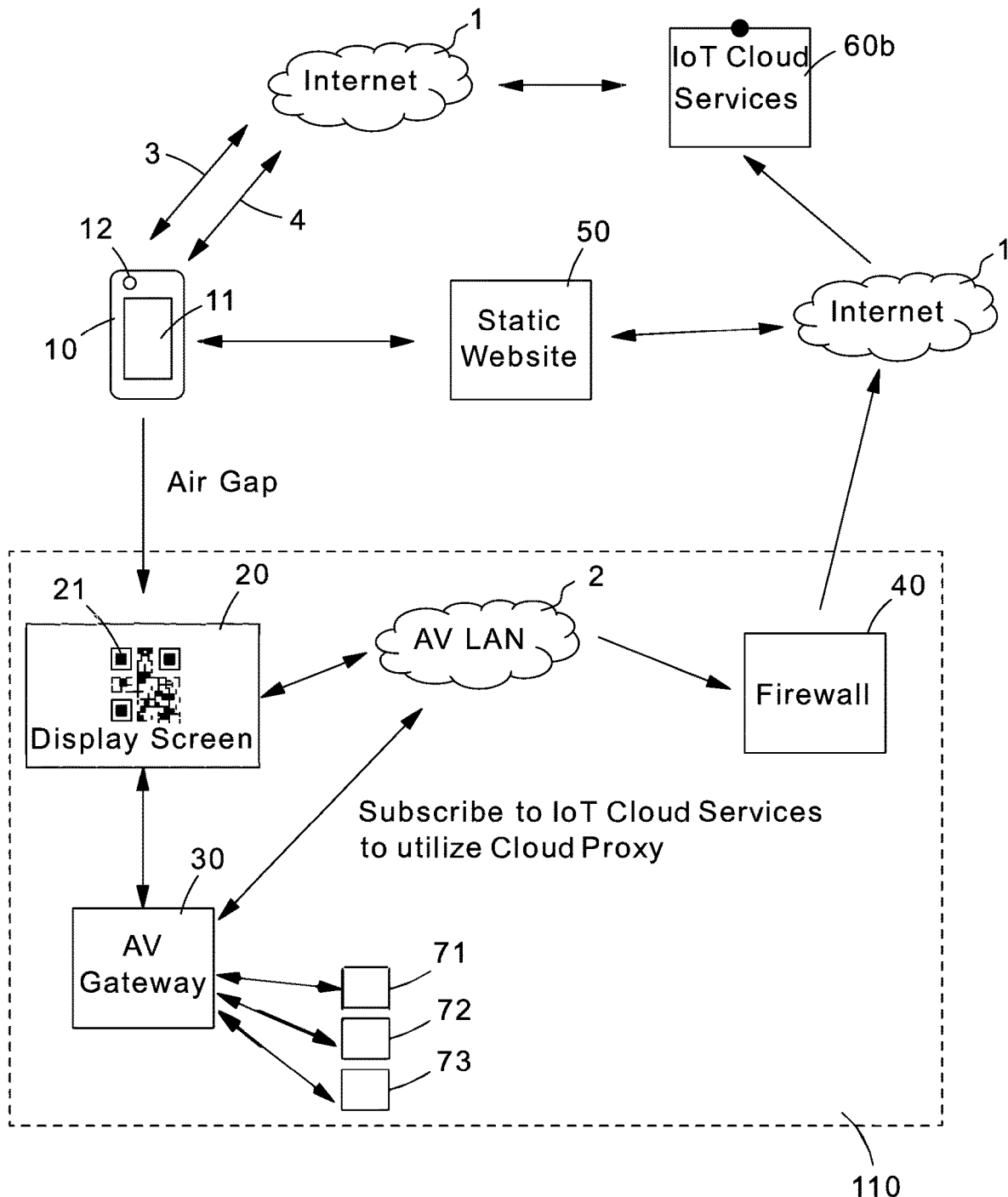
FIG. 5 shows an exemplary system block diagram of a secure remotely controlled system, according to an alternative embodiment of the present disclosure.

FIG. 5 shows an exemplary block diagram of a secure remotely controlled system 500 that utilizes IoT cloud services 60b to enable a user to securely control an AV gateway 30 from the user's mobile device 10. The secure remotely controlled system 500 is similar to the secure remotely controlled system 100 in sharing many of the same components; however in the secure remotely controlled system 500 the MQTT broker 60a is replaced with the IoT cloud services 60b. So the message routing component has been changed, while the other system components remain the same.

The IoT cloud services 60b is a web services provider that provides the network infrastructure to host web sites and cloud services. The IoT cloud services 60b may be the same web services provider hosting the static website 50, or a separate web services provider according to some embodiments. The IoT cloud services 60b hosts a private web site that will be utilized as a cloud proxy configured to shuttle control commands between the static website 50 and the AV gateway 30, as will be described in more detail according to the flow diagram 600 shown in FIG. 6.

To create a connection between the IoT cloud services 60b and the AV gateway 30, a WebSocket is established between the AV gateway 30 and the IoT cloud services 60b. For ease of implementation, another WebSocket may be established between the mobile device 10 and the IoT cloud service 60b. Then the secure remotely controlled system 500 is configured to connect the Web Socket from the mobile device 10 to the Web Socket from the AV gateway 30 and managing these connections using security tokens (e.g., private key). For example, in the secure remotely controlled system 500 the machine-readable code 21 may be generated to include a digital signature, in addition to the URL for the static website 50, where the digital signature is provided to restrict access to the AV gateway 30. So either the AV gateway 30 or the IoT cloud services 60b, or both the AV gateway 30 and the IoT cloud services, generates a private key to encode the digital signature included in the machine-readable code 21 along with the URL address. According to some embodiments, the digital signature may be a hash function applied to data (e.g., including at least the URL address) utilized by the web browser running on the mobile device 10. The IoT cloud services 60b receives the data over the WebSocket established between the mobile device 10 and the IoT cloud services 60b. The data may also contain routing information used to get to the correct AV gateway 30. Comparing the digital signatures in the IoT cloud services 60b cloud service (e.g., comparison executed by a router device included in the IoT cloud services 60b) ensures the routing data for locating the correct AV gateway 30 has not been tampered with. The Web Socket connection from the browser to the IoT Cloud Service is stateful and therefore the hash can be kept along with the connection information to prevent tampering. In addition, the digital signature comparison (i.e., hash function verification) may be further executed on the AV gateway 30 as well to provide enhanced security.

This security mechanism is provided to prevent man in the middle or spoofing attacks. Once the Web Socket connections are established and security tokens successfully exchanged, the cloud proxy may be utilized to shuttle control commands between the mobile device 10 (via the static website 50) and the AV gateway 30, as described in more detail according to the flow diagram 600 shown in FIG. 6

FIG. 6 shows an exemplary flow diagram 600 describing a process for implementing a secure remote control of the AV gateway 30. The description for the flow diagram 600 is made with reference to the components included in the secure remotely controlled system 500, although the process may be applicable to other similar systems. According to some embodiments, the features attributed to the mobile device 10 may be enabled by downloading and executing a secure application for gaining access to the AV gateway 30 on the mobile device 10, as described herein.

At 601, both the mobile device 10 and the AV gateway 30 establish independent connections to the IoT cloud services 60b. For the mobile device 10, a first Web Socket connection is established to enable the mobile device 10 to transmit messages to the IoT cloud services 60b, where the IoT cloud services 60b includes a cloud proxy (e.g., a cloud web services proxy). For the AV gateway 30, a second WebSocket connection is established to enable the AV gateway 30 to receive messages from the IoT cloud services 60b. More specifically, the AV gateway 30 may receive control command messages from the cloud proxy that is included in the IoT cloud services 60b via the WebSocket connection established between the AV gateway and the IoT cloud services 60b.

At 602, the display screen 20 corresponding to the AV gateway 30 displays the machine-readable code 21. The machine-readable code 21 may be, for example, a QR code generated by the AV gateway 30. The QR code includes a digital signature that is encoded by a private key generated by the AV gateway 30 or received from the IoT cloud services 60b.

According to some embodiments, an additional authentication step may be added before allowing the user to capture the image of the machine-readable code 21. For example, the user may be required to execute the secure application, where the secure application requires the user to input a passcode or provide some other authentication protocol (e.g., token or certification) before allowing the mobile device 10 to proceed to subsequent steps in the process described by the flow diagram 200. In addition or alternatively, the QR code may be replaced with a PIN or other alphanumeric passcode displayed onto the display screen 20. The machine-readable code 21, or its equivalent, may be updated to be different periodically to enhance security.

At 603, the mobile device 10 utilizes its image capturing device 12 to capture an image of the machine-readable code 21. For example, the user may open a camera application on the mobile device to enable utilizing the image capturing device 12 to capture and/or scan the image of the machine-readable code 21. The mobile device 10 may then decode and read the machine-readable code 21 to obtain the URL address for the static website 50.

The image of the machine-readable code 21 is scanned for information, and the secure application may further prevent/restrict the image of the machine-readable code 21 from being stored on either the mobile device 10 or the image capturing device 12 which enhances security by requiring physical access to the display screen 20. According to some embodiments, an additional authentication step may be added before decoding the machine-readable code 21. For example, the user may be required to input a passcode or provide some other authentication protocol (e.g., token or certification) before the machine-readable code 21 is decoded and/or the mobile device 10 is allowed to proceed to subsequent steps in the process described by the flow diagram 200.

At 604, the mobile device 10 opens a browser that navigates to the URL address for the static website 50 recognized from the machine-readable code 21. Alternatively, the secure application may coordinate navigation to the URL address for the static website 50 based on the input of the correct PIN (or other human readable code) displayed on the display screen 20.

At 605, the browser running on the mobile device 10 displays the control GUI 310 that is hosted on the static website 50, where the control GUI 310 is the same as provided on the display screen 20 for controlling the AV gateway 30.

At 606, the mobile device 10 receives user command inputs through the control GUI 310. The command inputs are for controlling the AV gateway 30.

At 607, the mobile device 10 transmits a message to the IoT cloud services 60b (e.g., cloud proxy), where the message includes the user command inputs.

At 608, the IoT cloud services 60b receives the message and pushes the message to the AV gateway 30 via the WebSocket established between the IoT cloud services 60b and the AV gateway 30.

At 609, the AV gateway 30 receives the message from the IoT cloud services 60b, where the message includes the user command inputs. According to some embodiments, the message may further include the digital signature encoded with the private key stored in the AV gateway 30 and included in the machine-readable code 21. In these embodiments, the AV gateway 30 includes the corresponding security tokens (digital signature) used to calculate a unique hash for comparison, thus authenticating the message.

At 610, the AV gateway 30 reads the user command inputs from the message and executes the user command inputs to control the corresponding remote AV equipment 71-73 that are in communication with the AV gateway 30.

The flow diagram 600 is provided for exemplary purposes, as the secure remotely controlled system 500 may implement other processes that include fewer, or additional, steps to accomplish the secure remote control of the AV gateway 30 utilizing IoT cloud services 60b.

Figure 4:
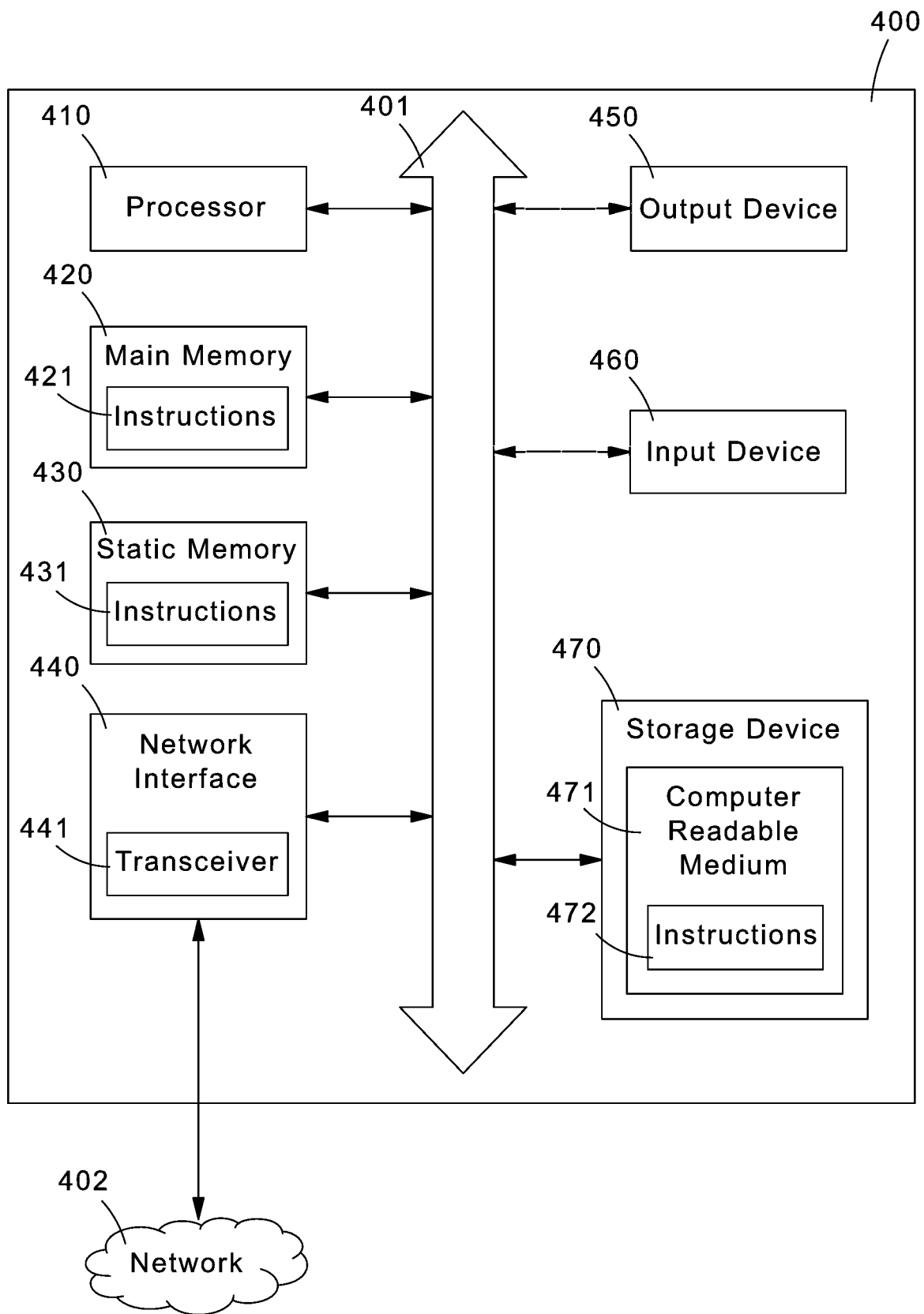
FIG. 4 shows a block diagram of an exemplary computing device system that is representative of a computing device included in the secure remotely controlled system, according to an embodiment of the present disclosure.

FIG. 4 illustrates an exemplary computer architecture for a computing device system 400. For example, the computing device system 400 may be representative of the components included in one or more of the mobile device 10, the AV gateway 30, or the MQTT broker 60 illustrated in the secure remotely controlled system 100 of FIG. 1. Although not specifically illustrated, the computing device system 400 may additionally include software, hardware, and/or circuitry for implementing attributed features as described herein.

The computing device system 400 includes a processor 410, a main memory 420, a static memory 430, an output device 450 (e.g., a display or speaker), an input device 460, and a storage device 470, communicating via a bus 401. The bus 401 may represent one or more busses, e.g., USB, PCI, ISA (Industry Standard Architecture), X-Bus, EISA (Extended Industry Standard Architecture), or any other appropriate bus and/or bridge (also called a bus controller).

The processor 410 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 410 executes instructions 421, 431, 472 stored on one or more of the main memory 420, static memory 430, or storage device 470, respectively. The processor 410 may also include portions of the computing device system 400 that control the operation of the entire computing device system 400. The processor 410 may also represent a controller that organizes data and program storage in memory and transfers data and other information between the various parts of the computing device system 400.

The processor 410 is configured to receive input data and/or user commands through input device 460 or received from a network 402 through a network interface 440. Input device 460 may be a keyboard, mouse or other pointing device, trackball, scroll, button, touchpad, touch screen, keypad, microphone, speech recognition device, video recognition device, accelerometer, gyroscope, global positioning system (GPS) transceiver, or any other appropriate mechanism for the user to input data to computing device system 400 and control operation of computing device system 400. Input device 460 as illustrated in FIG. 4 may be representative of any number and type of input devices.

The processor 410 may also communicate with other computer systems via the network 402 to receive control commands or instructions 421, 431, 472, where processor 410 may control the storage of such control commands or instructions 421, 431, 472 into any one or more of the main memory 420 (e.g., random access memory (RAM)), static memory 430 (e.g., read only memory (ROM)), or the storage device 470. The processor 410 may then read and execute the instructions 421, 431, 472 from any one or more of the main memory 420, static memory 430, or storage device 470. The instructions 421, 431, 472 may also be stored onto any one or more of the main memory 420, static memory 430, or storage device 470 through other sources. The instructions 421, 431, 472 may correspond to, for example, instructions for controlling AV equipment 71-73 included in the secure remotely controlled system 100 illustrated in FIG. 1.

Although the computing device system 400 is represented in FIG. 4 as a single processor 410 and a single bus 401, the disclosed embodiments apply equally to computing device system that may have multiple processors and to computing device system that may have multiple busses with some or all performing different functions in different ways.

The storage device 470 represents one or more mechanisms for storing data. For example, the storage device 470 may include a computer readable medium 471 such as read-only memory (ROM), RAM, non-volatile storage media, optical storage media, flash memory devices, and/or other machine-readable media. In other embodiments, any appropriate type of storage device may be used. Although only one storage device 470 is shown, multiple storage devices and multiple types of storage devices may be present. Further, although the computing device system 400 is drawn to contain the storage device 470, it may be distributed across other computer systems that are in communication with the computing device system 400, such as a server in communication with the computing device system 400. For example, when the computing device system 400 is representative of the mobile device 10, the storage device 470 may be distributed across to include a cloud storage platform.

The storage device 470 may include a controller (not shown) and a computer readable medium 471 storing instructions 472 capable of being executed by the processor 410 to carry out control of the remote AV equipment 71-73, as described herein. In another embodiment some, or all, the functions are carried out via hardware in lieu of a processor-based system. In some embodiments, the included controller is a web application browser, but in other embodiments the controller may be a database system, a file system, an electronic mail system, a media manager, an image manager, or may include any other functions capable of accessing data items.

The output device 450 is configured to present information to the user. For example, the output device 450 may be a display such as a liquid crystal display (LCD), a gas or plasma-based flat-panel display, or a traditional cathode-ray tube (CRT) display or other well-known type of display that may, or may not, also include a touch screen capability. Accordingly, the output device 450 may function to display a graphical user interface (GUI) such as the GUI for enabling a user to control the AV equipment, as described herein. In other embodiments, the output device 450 may be a speaker configured to output audible information to the user. In still other embodiments, any combination of output devices may be represented by the output device 450.

Computing device system 400 also includes the network interface 440 that allows communication with other computers via the network 402, where the network 402 may be any suitable network and may support any appropriate protocol suitable for communication to/from computing device system 400. In an embodiment, the network 402 may support wireless communications. In another embodiment, the network 402 may support hard-wired communications, such as a telephone line or cable. In another embodiment, the network 402 may support the Ethernet IEEE (Institute of Electrical and Electronics Engineers) 802.3x specification. In another embodiment, the network 402 may be the Internet (e.g., the Internet 1 illustrated in FIG. 1) and may support IP (Internet Protocol). In another embodiment, the network 402 may be a LAN (e.g. AV LAN 2 illustrated in FIG. 1) or a wide area network (WAN). In another embodiment, the network 402 may be a hotspot service provider network. In another embodiment, network 402 may be an intranet. In another embodiment, the network 402 may be a GPRS (General Packet Radio Service) network. In another embodiment, the network 402 may be any appropriate cellular data network or cell-based radio network technology. In another embodiment, the network 402 may be an IEEE 802.11 wireless network. In another embodiment, the network 402 may be representative of an Internet of Things (IoT) network. In still another embodiment, the network 402 may be any suitable network or combination of networks. Although one network 402 is shown in FIG. 4, the network 402 may be representative of any number of networks (of the same or different types) that may be utilized.

The network interface 440 provides the computing device system 400 with connectivity to the network 402 through any compatible communications protocol. The network interface 440 sends and/or receives data from the network 402 via a wireless or wired transceiver 441. The transceiver 441 may be a cellular frequency, radio frequency (RF), infrared (IR), Bluetooth, or any of a number of known wireless or wired transmission systems capable of communicating with the network 402 or other computer device having some or all of the features of the computing device system 400. The network interface 440 as illustrated in FIG. 4 may be representative of a single network interface card configured to communicate with one or more different data sources. Furthermore, the network interface 440 may be representative of AV related communication ports such as high-definition multimedia interface (HDMI), DisplayPort, or mini DisplayPort (MDP), as well as data communication ports such as ethernet, universal serial bus (USB), power over ethernet (POE), or single pair ethernet (SPE).

The computing device system 400 may be implemented using any suitable hardware and/or software, such as a personal computer or other electronic computing device. In addition, the computing device system 400 may also be a smartphone, portable computer, laptop, tablet or notebook computer, PDA, appliance, IP telephone, server computer device, AV gateway, MQTT broker, cloud services infrastructure device, or mainframe computer.

As is readily apparent from the foregoing, various non-limiting embodiments of the secure remotely controlled system have been described. While various embodiments have been illustrated and described herein, they are exemplary not intended to be limiting. Instead, the words used herein are words of description rather than limitation, and it is understood that various changes may be made to these embodiments without departing from the spirit and scope of the following claims.

What is claimed is:

1. A computing device comprising:
   an image capturing device;
   a display screen;
   a processor; and
   a storage device configured to store machine-readable instructions that, when executed by the processor, causes the processor to:
      establish a communication channel between the computing device and a message routing component by registering the computing device as a client of the message routing component;
      control the image capturing device to capture an image of a machine-readable code displayed on a display screen of a gateway device, wherein the gateway device is configured to be subscribed to the message routing component to receive messages published by the message routing component;
      display a graphical user interface (GUI) on the display screen corresponding to a device GUI available on the gateway device;
      receive, via inputs corresponding to the displayed GUI, control commands; and
      transmit the control commands to the message routing component, wherein the message routing component is configured to communicate the control commands to the gateway device by publishing the control commands within a message for the gateway device to receive as a subscriber to the message routing component.

2. The computing device of claim 1, wherein the storage device is further configured to store machine-readable instructions that, when executed by the processor, causes the processor to:
   extract web site address information from the captured image;
   open a browser application;
   control the browser application to connect to a web site based on the web site address information; and
   display the GUI on the display screen based on GUI information received from the web site.

3. The computing device of claim 2, wherein the web site is hosted on a content delivery network (CDN).

4. The computing device of claim 1, wherein the message routing component is a Message Queuing Telemetry Transport (MQTT) broker;
   wherein the storage device is configured to store machine-readable instructions that, when executed by the processor, causes the processor to:
      establish the communication channel between the computing device and the MQTT broker by registering the computing device as a client of the MQTT broker; and
   wherein the gateway device is configured to subscribe to the MQTT broker so that the gateway device receives the message from the MQTT broker when the MQTT publishes the message.

5. The computing device of claim 1, wherein the message routing component is a cloud services web site proxy;
   wherein the storage device is further configured to store machine-readable instructions that, when executed by the processor, causes the processor to:
      establish the communication channel between the computing device and the cloud services web site proxy by establishing a Web Socket between the computing device and the cloud services web site proxy; and
   wherein the cloud services web site proxy is configured to push the message to the gateway device.

6. The computing device of claim 5, wherein the machine-readable code includes a digital signature encoded using a private key generated by one of the gateway device or the cloud services web site proxy.

7. The computing device of claim 5, wherein the machine-readable code is periodically updated into a different form.

8. The computing device of claim 1, wherein the computing device is one of a smartphone, a laptop, or a tablet computing device.

9. The computing device of claim 1, wherein the gateway device is an audio-video (AV) gateway for controlling remote AV devices, the AV gateway and the remote AV devices are included as part of a private AV network behind a firewall.

10. A gateway computing device comprising:
    a display screen;
    a processor; and
    a storage device configured to store machine-readable instructions that, when executed by the processor, causes the processor to:
       establish a communication channel between the gateway computing device and a message routing component by registering the gateway computing device as a client of the message routing component;
       subscribe to the message routing component to retrieve messages published by the message routing component;

display a machine-readable code on the display screen;

receive, from the message routing component via subscription, a message including a control command for controlling remote equipment; and control the remote equipment according to the control command included in the message.

11. The gateway computing device of claim 10, wherein the message routing component is a Message Queuing Telemetry Transport (MQTT) broker;

wherein the storage device is configured to store machine-readable instructions that, when executed by the processor, causes the processor to:

establish the communication channel between the gateway computing device and the MQTT broker by registering the computing device as a subscriber to a topic published by the MQTT broker; and wherein the message received from the MQTT broker corresponds to the subscribed topic.

12. The gateway computing device of claim 10, wherein the message routing component is a cloud services web site proxy;

wherein the storage device is configured to store machine-readable instructions that, when executed by the processor, causes the processor to:

establish the communication channel between the gateway computing device and the cloud services web site proxy by establishing a Web Socket between the gateway computing device and the cloud services web site proxy.

13. The gateway computing device of claim 12, wherein the gateway computing device is configured to control the remote equipment, and the gateway computing device and the remote equipment are configured to be included as part of a private network; and wherein the machine-readable code includes a digital signature encoded using a private key generated by one of the gateway computing device or the cloud services web site proxy.

14. The gateway computing device of claim 12, wherein the gateway computing device is configured to control the remote equipment, and wherein the machine-readable code includes a digital signature encoded using a private key generated by one of the gateway computing device or the cloud services web site proxy.

15. The gateway computing device of claim 10, wherein the gateway computing device is configured to control the remote equipment.

16. The gateway computing device of claim 10, wherein the gateway computing device and the remote equipment are included as part of a private network behind a firewall.

17. The gateway computing device of claim 10 wherein the gateway computing device is an audio-video (AV) gateway, and wherein the AV gateway and the remote equipment are included as part of a private AV network behind a firewall.

18. The gateway computing device of claim 10, wherein the display screen is a touch screen.

19. The gateway computing device of claim 10, wherein the machine-readable code is periodically updated into a different form.

* * * * *